(12) United States Patent
Speich

(10) Patent No.: US 7,913,917 B2
(45) Date of Patent: Mar. 29, 2011

(54) RFID TAG

(75) Inventor: Francisco Speich, Gipf-Oberfrick (CH)

(73) Assignee: Textilma AG, Stansstad (CH)

( * ) Notice: Subject to any disclaimer, the term of this patent is extended or adjusted under 35 U.S.C. 154(b) by 257 days.

(21) Appl. No.: 12/309,302

(22) PCT Filed: Jul. 19, 2007

(86) PCT No.: PCT/CH2007/000353
§ 371 (c)(1),
(2), (4) Date: Jan. 13, 2009

(87) PCT Pub. No.: WO2008/011739
PCT Pub. Date: Jan. 31, 2008

(65) Prior Publication Data
US 2009/0321531 A1    Dec. 31, 2009

(30) Foreign Application Priority Data
Jul. 24, 2006   (CH) ...................................... 1193/06

(51) Int. Cl.
*G06K 19/06*    (2006.01)
(52) U.S. Cl. ..................................... 235/492

(58) Field of Classification Search .................... 235/492
See application file for complete search history.

(56) References Cited

U.S. PATENT DOCUMENTS

| | | |
|---|---|---|
| 5,624,514 A | 4/1997 | Frowein |
| 5,896,087 A | 4/1999 | Frowein |
| 2004/0188531 A1 | 9/2004 | Gengel et al. |
| 2008/0007479 A1 | 1/2008 | Hiltmann et al. |

FOREIGN PATENT DOCUMENTS

| | | |
|---|---|---|
| EP | 822 527 A | 2/1998 |
| ES | 2 206 029 A | 5/2004 |
| FR | 2 823 989 A | 10/2002 |
| WO | WO 94/29503 A | 12/1994 |
| WO | WO 02/27651 A | 4/2002 |
| WO | WO 02/093524 A | 11/2002 |
| WO | WO 03/065303 A | 7/2003 |
| WO | WO 2006/029543 A | 3/2006 |

*Primary Examiner* — Michael G Lee
*Assistant Examiner* — Kristy A Haupt
(74) *Attorney, Agent, or Firm* — George Pappas

(57) ABSTRACT

In order to improve an RFID tag, the same is provided with a textile layer that is subdivided into two sections along a folding line. The first section is embodied as a design tag while the second section is folded over the first section, is configured as a transponder tag, and comprises an incorporated or applied antenna that is connected to a chip.

20 Claims, 2 Drawing Sheets

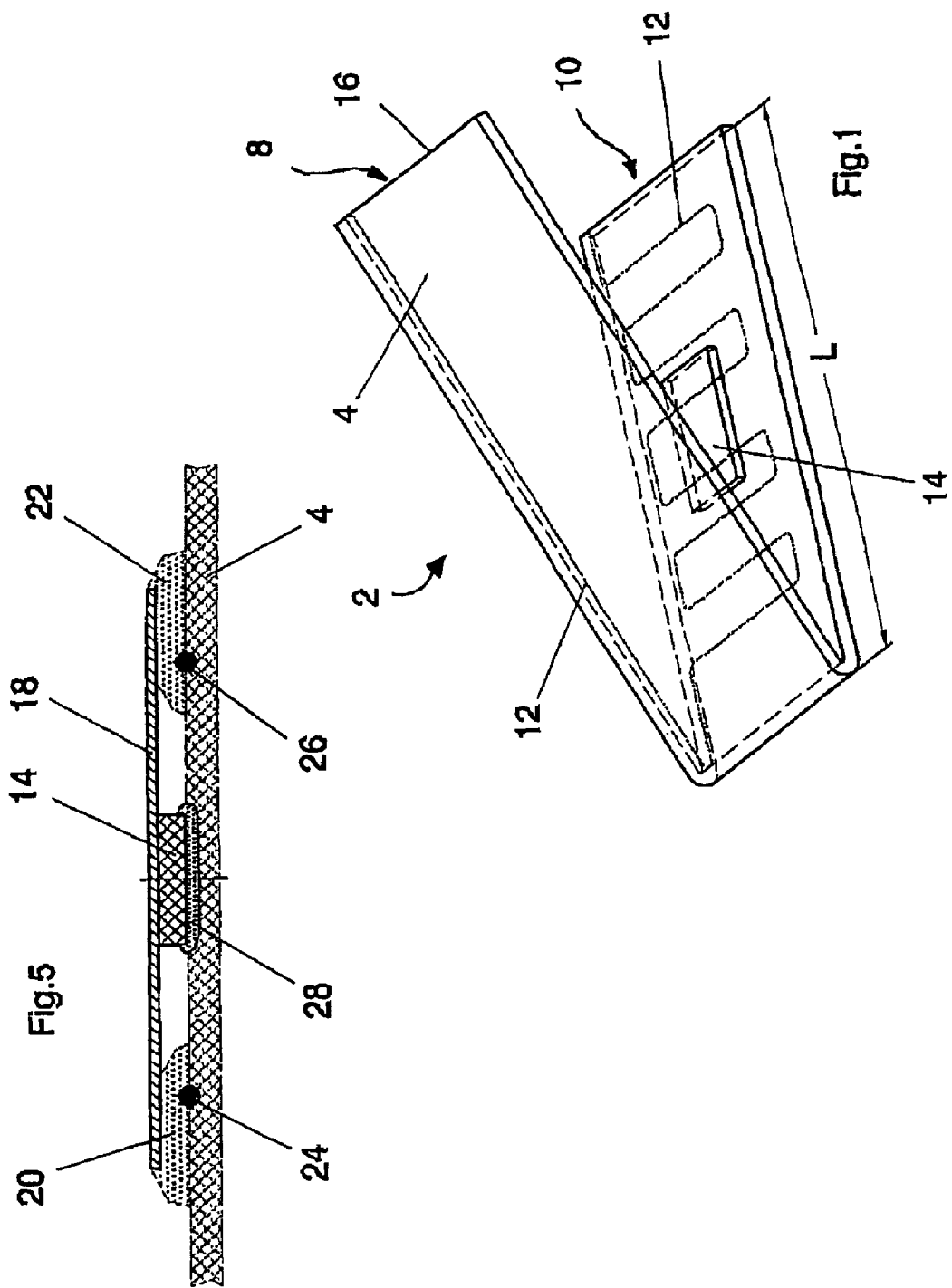

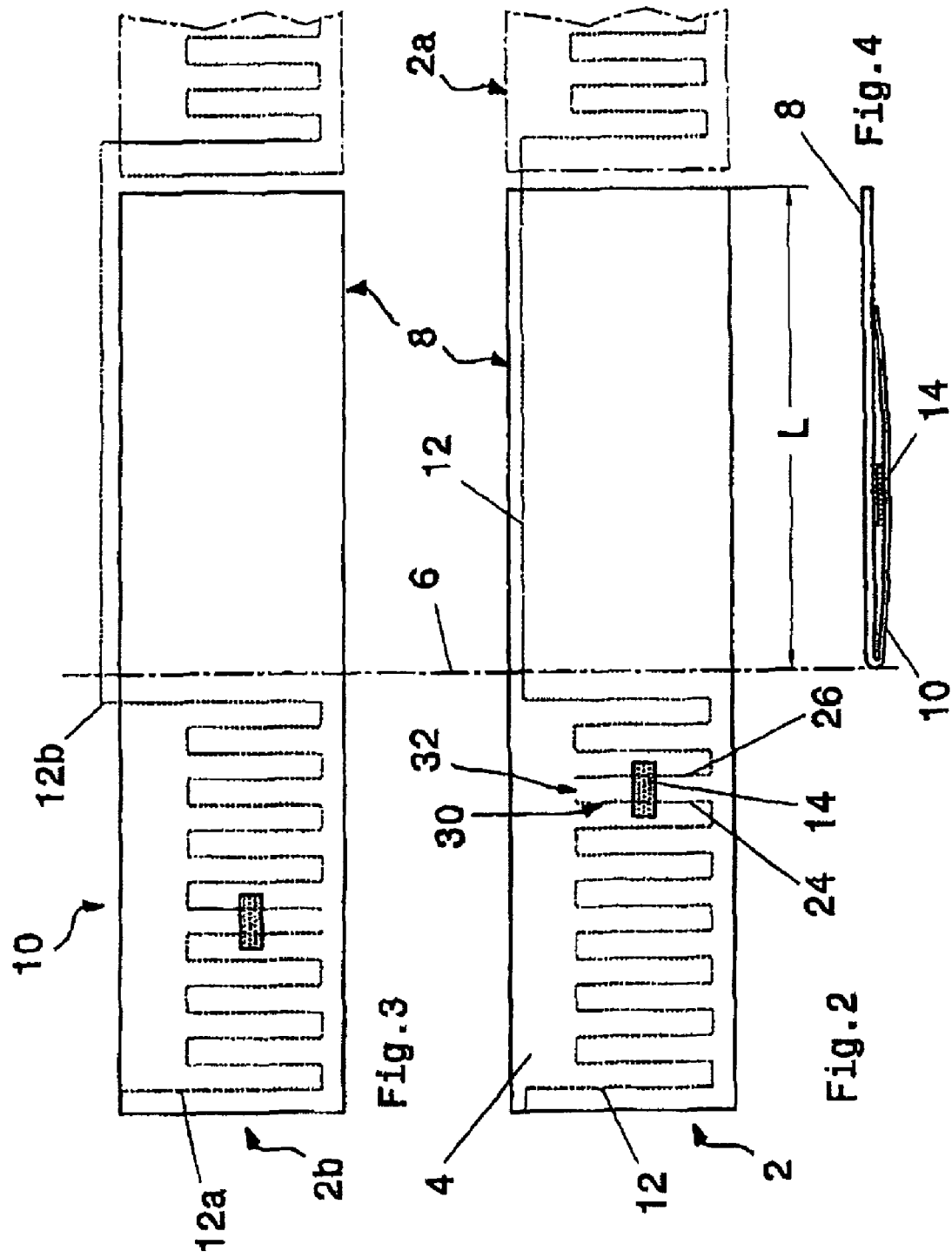

RFID TAG

This application claims priority of PCT application PCT/CH2007/000353 having a priority date of Jul. 24, 2006; the disclosure of which is incorporated herein by reference.

TECHNICAL FIELD

The invention relates to an RFID tag.

PRIOR ART

From WO02093524 A, an RFID tag is known in which a complete transponder consisting of an antenna arranged on a carrier, with connected chip, is first transferred to a carrier layer which is then connected to a design tag, the latter overlapping the carrier layer in the manner of a hem. Since the transponder is present as a unit, it forms its own layer and thus leads to a three-layer, and thus relatively thick and rigid RFID tag. Such RFID tags are relatively complex and not very flexible and, when used in items of clothing, form undesirable points of discontinuity which adversely affect the wearing comfort.

From WO9429503, a further RFID tag is known in which the design tag consists of two layers which form pockets into which the transponders are inserted. This multi-layered RFID tag, too, is not only difficult to produce but also relatively thick and rigid and thus has the same unwanted characteristics as the RID tag described above.

PRESENTATION OF THE INVENTION

It is the object of the invention improve an RFID tag of the type initially mentioned. Due to the fact that the RFID tag has a textile layer which is subdivided into two sections along a folding line, wherein the first section is constructed as a design tag over which the second section is folded which is constructed as a transponder tag and which contains incorporated or applied an antenna which is connected to the chip, firstly a very simple RFID tag is obtained since it can be produced in one piece and one side of the design tag is thus already permanently connected to the transponder tag. The second section of the textile layer can be produced with a significantly lower number of threads per cm than the first section. The chip and the antenna thread do not need to be incorporated via the thickening given by the floating figure threads. Due to the fact that the antenna is incorporated into the textile layer or applied to it, the chip is also arranged directly on the textile layer and connected to the antenna and thus forms a transponder tag which is connected directly to the design tag. This sandwich-like construction also protects the antenna and the chip. Thus, there is an only two-layer RFID tag which is much thinner and less bulky than the known three-layer RFID tags. This improves the flexibility of the RFID tag and thus its handling and wearing comfort.

It is preferred if the antenna is arranged in meander or zigzag form or like a coil in or on the textile layer. The antenna can in each case be run up to the section edge at the second section and thus have no continuation in the first section. However, it is also possible to run the antenna along the design tag up to the edge which faces away from the folding line. This is of advantage, in particular, for producing the RFID tags since such RFID tags, as a rule, are produced successively on a weaving machine and the antenna thread can then be run without interruption continuously from one tag to the next.

The RFID tag preferably has an RF or UHF chip.

The textile layer is knitted or woven, the antenna being knitted in or woven in. The textile layer can also be constructed as a nonwoven, in or on which an antenna is arranged.

The RFID tag can also be plasticized as a result of which the adhesiveness can be improved.

It is also of advantage if, the textile layer contains a hot-melt adhesive thread by means of which the sections are joined to one another.

The antenna can be soldered to the chip. It is particularly simple if, the antenna is connected to the chip by means of an electrically conductive adhesive. A particularly stable embodiment is obtained if the chip is additionally joined to the textile layer by bonding.

The second section is at most as large as the first section so that the second section does not protrude over the design tag.

If the textile layer is woven and the folding line extends in the weft direction, the antenna thread can be treated, that is to say supplied and laid, in the manner of a warp thread.

It is particularly advantageous if the textile layer with the incorporated antenna, is produced on a needle weaving machine which results in protected edges. A production is also possible where the textile layer with the incorporated antenna is produced on a broad weaving machine and is then cut into individual strips.

The aforementioned elements and the claimed elements described in the following exemplary embodiments, to be used according to the invention, are subject to no special conditions of exception in size, shaping, use of material and technical design so that the selection criteria known in the respective field of application can be applied unrestricted.

BRIEF DESCRIPTION OF THE DRAWINGS

Further details, advantages and features of the subject matter of the present invention are obtained from the following description of the associated drawings, in which:

FIG. 1 shows an RFID tag with design tag with transponder tag folded over it in a graphical representation;

FIG. 2 shows the RFID tag of FIG. 1 in the opened state in a top view;

FIG. 3 shows the RFID tag of FIG. 2 in modified forms;

FIG. 4 shows the RFID tag of FIG. 1 in a side view;

FIG. 5 shows the chip arrangement in cross section.

APPROACHES TO CARRYING OUT THE INVENTION

FIG. 1 shows in a graphical representation an RFID tag 2 which is formed from a textile layer 4 which is subdivided into a first section 8 and into a second section 10 along a folding line 6. The first section is constructed as a design tag and can be provided with corresponding image and/or word symbols. The second section 10 which is constructed as a transponder tag contains an antenna 12 which, in the example shown, is incorporated into the textile layer 4 in a meander-shaped arrangement. A chip 14 is connected to the antenna. The length L of the second section 10 is at most as large as or preferably smaller than the length of the first section 8. The second section 10 is folded over the first section 8 and rests against the latter as can be seen, in particular, from FIG. 4. In this arrangement, the second section 10 can be joined to the first section 8 not only along the folding line 6 but also by means of additional measures such as, for example, bonding by adhesive threads, not shown in greater detail, in one of the sections.

FIG. 2 shows the plan view of the opened RFID tag 2 from which the arrangement of the antenna can be seen. In the second section 10, the antenna 12 extends in meander form and is run in a straight line from the folding line 6 to an edge 16 which faces away from the folding line 6 in the first section 8 of the textile layer 4. This construction has the advantage that the antenna 12 can be inserted continuously in a textile layer 4 produced in the form of a ribbon and changes seamlessly from one RFID tag 2 into a subsequent RFID tag 2a. Such a tag is preferably produced by means of a needle weaving machine, wherein the folding line extends in the direction of the weft and the antenna 12 can be supplied analogously to a warp thread.

FIG. 3 shows a modified embodiment of the RFID tag 2b in which the antenna 12a is run laterally to the outside at the second section 10 and extends outside the first section 8 during the production of the RFID tag. The antenna thread 12b lying outside the first section is cut off after the production of a ribbon of RFID tags.

As can be seen, in particular, from FIG. 5, the chip 14 has a carrier 18 which contains the terminals of the chip, not shown in greater detail, which are in each case conductively connected antenna sections 24, 26 of the antenna 12 via a conductive adhesive 20, 22. In addition, the chip 14 is joined to the textile layer 4 by a further adhesive 28. In the area of the chip 14, the antenna 12 has a short circuit bridge 30 which can be eliminated by an interruption 32. The arrangement is made in such a manner that antenna sections of approximately equal length are available on both sides of the chip 14.

LIST OF REFERENCE DESIGNATIONS

L Length of the second section
2 RFID tag
2a RFID tag
2b RFID tag
4 Textile layer
6 Folding line
8 First section
10 Second section
12 Antenna
12a Antenna
12b Antenna
14 Chip
16 Edge
18 Carrier
20 Adhesive
22 Adhesive
24 Antenna section
26 Antenna section
28 Adhesive
30 Short circuit bridge
32 Interruption

The invention claimed is:

1. An RFID tag with a textile design tag on the rear of which a transponder is arranged which has a chip provided with an antenna, wherein the RFID tag has a textile layer which is subdivided into two sections along a folding line, wherein the first section is constructed as a design tag over which the second section is folded which is constructed as a transponder tag, characterized in that the second section contains incorporated or applied an antenna which is connected to the chip and in that the textile layer is knitted or woven, the antenna being knitted in or woven in.

2. The RFID tag as claimed in claim 1, characterized in that the antenna is arranged in meander or zigzag form or like a coil.

3. The RFID tag as claimed in claim 2, characterized in that the antenna is in each case run up to the section edge at the second section.

4. The RFID tag as claimed in claim 2, characterized in that the antenna extends along the design tag up to the edge which faces away from the folding line.

5. The RFID tag as claimed in claim 2, characterized in that the transponder has an RF or UHF chip.

6. The RFID tag as claimed in claim 2, characterized in that the textile layer contains a hot-melt adhesive thread by means of which the sections are joined to one another.

7. The RFID tag as claimed in claim 2, characterized in that the antenna is connected to the chip by means of an electrically conductive adhesive.

8. The RFID tag as claimed in claim 1, characterized in that the antenna is in each case run up to the section edge at the second section.

9. The RFID tag as claimed in claim 8, characterized in that the transponder has an RF or UHF chip.

10. The RFID tag as claimed in claim 1, characterized in that the antenna extends along the design tag up to the edge which faces away from the folding line.

11. The RFID tag as claimed in claim 1, characterized in that the transponder has an RF or UHF chip.

12. The RFID tag as claimed in claim 1, characterized in that it is plasticized.

13. The RFID tag as claimed in claim 1, characterized in that the textile layer contains a hot-melt adhesive thread by means of which the sections are joined to one another.

14. The RFID tag as claimed in claim 1, characterized in that the antenna is soldered to the chip.

15. The RFID tag as claimed in claim 1, characterized in that the antenna is connected to the chip by means of an electrically conductive adhesive.

16. The RFID tag as claimed in claim 1, characterized in that the chip is additionally bound to the textile layer by bonding.

17. The RFID tag as claimed in claim 1, characterized in that the second section is at most as large as the first section.

18. The RFID tag as claimed in claim 1, characterized in that the textile layer is woven and the folding line extends in the weft direction.

19. The RFID tag as claimed in claim 1, characterized in that the textile layer with the incorporated antenna is produced on a needle weaving machine.

20. The RFID tag as claimed in claim 1, characterized in that the textile layer with the incorporated antenna is produced and cut out on a broad weaving machine.

* * * * *